June 2, 1970  H. K. A. DE LANGE  3,515,921
DEVICE FOR PRODUCING A PULSE SEQUENCE
Filed March 26, 1969
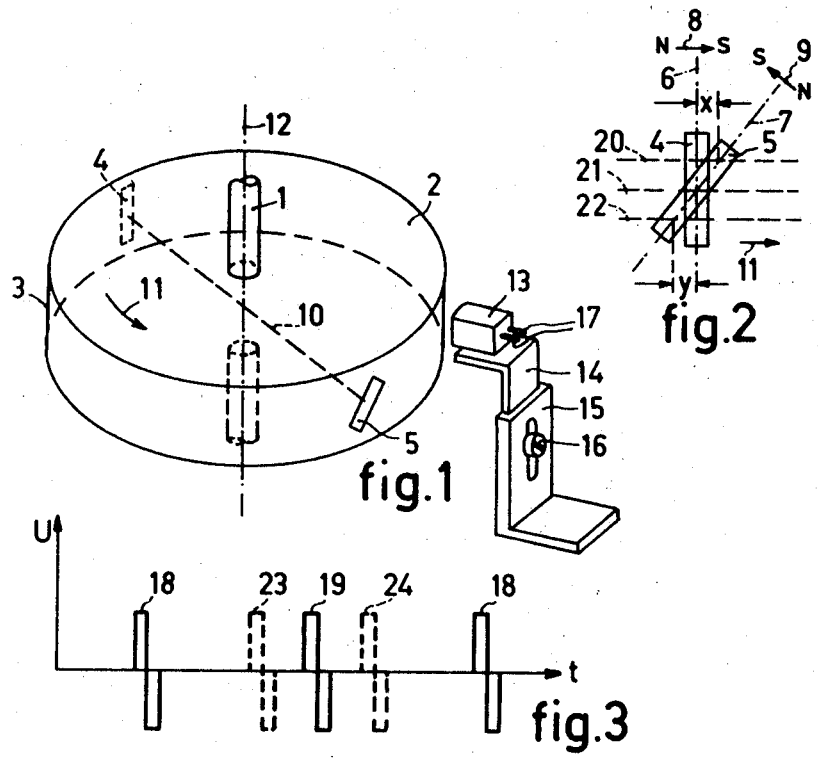
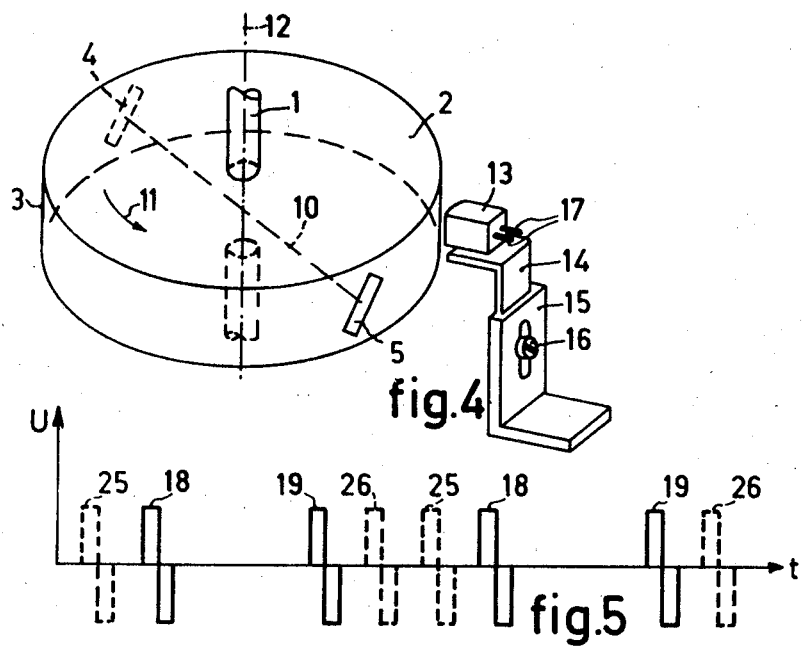
INVENTOR.
HERMAN K.A. DE LANGE
BY
Frank R. ~~~~~
AGENT

3,515,921
DEVICE FOR PRODUCING A PULSE SEQUENCE
Herman Kasper Adriaan De Lange, Emmasingel, Eindhoven, Netherlands, assignor to U.S. Philips Corporation, New York, N.Y., a corporation of Delaware
Filed Mar. 26, 1969, Ser. No. 810,663
Claims priority, application Austria, Apr. 1, 1968,
A 3,146/68
Int. Cl. H02k *17/42*
U.S. Cl. 310—168     3 Claims

ABSTRACT OF THE DISCLOSURE

Device for producing a pulse sequence includes a disk supported on a rotatable shaft. The periphery of the disk is provided with two elongated magnets, at least one of which is positioned at an acute angle to the direction of the rotary axis of the disk. An adjustable magnetic head arrangement is positioned at the outer peripheral portion of the disk for measuring the pulse sequences of the rotating magnets of the disk at various positions.

---

The invention relates to a device for producing a pulse sequence in dependence upon the number of revolutions of a rotatable system, in which the periphery of a rotatable disc of the system is provided at different places with magnets and a stationary magnet head is provided along which the magnets can be passed. Such a device is frequently employed for controlling the number of revolutions of a rotatable system by means of a servo-system, in which the pulse sequence supplied by the magnet head, the pulses of which are formed at each passage of a magnet along the magnet head, is a measure for the instantaneous number of revolutions of the system. In the servo-system this actual signal is compared with a desired signal, from which a control-magnitude for the system is derived. As soon as more than one magnet is provided on the disc, the relative positions of the magnets play a decisive part, since apart from the number of revolutions of the disc the order of succession of the separate pulses induced in the magnet head in time is thus determined. This has involved hitherto the difficult problem, which can be solved only at high costs, that the magnets have to be adjusted with great accuracy in their relative positions on the disc in order to ensure that with a constant number of revolutions of the disc the separate pulses succeed each other with predetermined equal time intervals.

The invention obviates this problem in a simple manner by providing two magnets, each having an elongated pole-face, diammetrically on the periphery of the disc for obtaining two pulses in each revolution of the rotatable disc, at least one of the pole-faces being arranged with its longitudinal axis at an acute angle to the direction of the rotary axis of the disc, whilst the magnet head is adjustable in the direction of the rotary axis of the disc. By a simple adjustment of the magnet head the time interval between the two pulses produced in each revolution of the disc can thus be varied so that accurate positioning of the magnets on the disc is no longer required.

In a preferred embodiment of the invention each of the pole-faces is formed by a side-face of a rod magnet, being magnetised transversely to its longitudinal axis, said pole-faces being arranged in a plane tangential to the periphery of the disc. By this measure sharply defined pulses are obtained.

It is of advantage to arrange in this embodiment both of the rod magnets with their longitudinal axes inclined to the direction of the rotary axis of the disc, the directions of inclination, viewed in a projection in the direction of a line connecting the centre of one magnet with the centre of the other, being the same. Thus the range of potential variations of the time interval between the pulses is enlarged.

The invention will be described more fully hereinafter with reference to the drawing, in which two embodiments thereof are illustrated, to which it is, however, not restricted. FIG. 1 shows device in which one of the two magnets is inclined to the direction of the rotary axis of the disc. FIG. 2 serves for explaining the operation of the device of FIG. 1 and FIG. 3 illustrates a diagram of the resultant pulse sequence. FIG. 4 shows a device in which both magnets are inclined to the direction of the rotary axis of the disc and FIG. 5 shows the associated diagram of the pulse sequence.

Referring to FIG. 1, reference numeral 1 designates a shaft of a rotatable system, the number of revolutions of which has to be kept constant via means (not shown), for example, a driving motor controlled by a servo-system. Such a shaft may be the driving shaft of a record carrier in a recording and/or playback apparatus. This shaft is provided with a disc 2, to the periphery 3 of which are secured, for example, by gluing, two rod magnets 4 and 5. These magnets are magnetised transversely of their longitudinal axes 6, 7 in accordance with the directions of the arrows 8, 9, as is shown schematically in FIG. 2 in a projection in the direction of a line 10 connecting the centre of one magnet with the centre of the other, so that in the direction of rotation 11 of the disc the magnetic poles consantly alternate.

The longitudinal axis 6 of the magnet 4 extends in the direction of the rotary axis 12 of the disc, whereas the longitudinal axis 7 of the magnet 5 is at an acute angle to the direction of the rotary axis. The two magnets are thus located in a plane tangential to the circumference of the disc, whilst theoretically the magnet 5 touches the disc periphery only at one point. The arrangement is such that a diameter of the disc 10 extends approximately between the centres of the rod magnets so that viewed in the projection of FIG. 2 the two magnets appear in crosswise arrangement.

With these magnets 4 and 5 co-operates a magnet head 13, which is adjustable in the direction of the rotary axis 12. For this purpose the magnet head 13 is arranged on a support 14, which is displaceable in the direction of length of a guide groove in a stationary part 15 of the apparatus and is fixable in a definite position by means of a screw connection 16. The electrical connections of the magnet head are designated by 17.

This magnet head 13 supplies in known manner an electric pulse at each passage of one of the magnets 4, 5 of the rotating disc. This pulse sequence is a measure for the number of revolutions of the rotating system and may therefore be used as the actual signal for a servo-system which signal by comparison with a required signal forms a control-magnitude for stabilizing the number of revolutions of the system. FIG. 3 illustrates the voltage-time diagram of such a pulse sequence it being assumed that the pulses 18 emanate from the magnet 4 and the pulse 19 is supplied by the magnet 5. With such a pulse sequence it is of paramount importance that with a constant number of revolutions of the disc the time interval between every two consecutive pulses that is to say the interval between a pulse 18 and the next pulse 19 and the interval between this pulse 19 and the next pulse 18 should be the same. If these intervals were not equal the control-arrangement would respond like in the case of a discrepancy of the number of revolutions of the disc and start a control-process which would result in an incorrect number of revolutions.

Since the magnet head 13 is displaceable in the direction of the rotary axis 12 the pulses 19 can be shifted in a simple manner into the correct position relative to the pulses 18 without the need for adjustment of the magnets on the disc itself. In FIG. 2 the broken lines 20, 21 and 22 indicate three different positions of the magnet head. It will be apparent that regardless of the position of the magnet head the magnet 4, by its perpendicular position, produces the pulses 18 invariably at the same instant. The magnet 5 has the effect, owing to its inclined position, that the pulses produced by it appear at different instants in different positions of the magnet head.

When the magnet head is in the position 20, the two magnets 4, 5 are relatively off-set by a value $x$ viewed from said magnet. When the disc is rotated in the direction of the arrow 11, the magnet 4 following the magnet 5 passes by the magnet head later than the magnet 5 following the magnet 4. This means that the time interval between a pulse following the pulse 18 is shorter than the interval between this pulse and the next pulse 18. Such a pulse sequence is indicated by the pulses 18, 23 and 18 in FIG. 3.

If the magnet head is in the position 22, the magnets 4, 5 are relatively off-set by the value $y$ viewed from said magnet, so that the situation is just the opposite. The magnet 4 following the magnet 5 passes by the magnet head earlier than the magnet 5 following the magnet 4. This means that a pulse sequence as indicated in FIG. 3 by 18, 24 and 18 is obtained.

If the magnet head is in the position 21, the pulse produced by the magnet 5 is intermediate between the pulses 23 and 24 as is indicated by 19. By a simple displacement of the independent magnet head 13 in the direction of the rotary axis 12 of the disc the relative positions of the pulses 18 and 19 can thus be varied in a simple manner. Consequently, also inaccuracies in the disposition of the magnets at the periphery of the disc, which result in an incorrect order of succession of the pulses 18, 19, 18, can be compensated in a simple manner. Thus the arrangement of the magnets at the corresponding places at the periphery of the disc is quite uncritical so that otherwise required complicated adjusting members can be dispensed with. By the choice of the value of the acute angle between the longitudinal axis 7 of the magnet 5 and the direction of the rotary axis 12 of the disc, the variation of the position of the pulse 19 can be controlled.

In the embodiment described above, only the position of the pulse 19 is varied. In the next embodiment the positions of the pulses 18 and 19 can be varied, so that a larger range of adjustment is obtained. For this purpose, as is shown in FIG. 4, the two rod magnets 4 and 5 are inclined with their longitudinal directions to the direction of the rotary axis 12 of the disc 2 and mounted at the periphery 3 of the disc, the directions of inclination, viewed in a projection in the direction of a diameter 10 connecting the centre of one magnet with the centre of the other, being the same. Owing to these equal directions of inclination in said projection, the magnets pass by the magnet head 13 with exactly opposite inclinations, so that when the magnet 5 passes by the magnet head, its longitudinal direction extends from left to right in upward direction, whereas, when the magnet 4 passes by the magnet head, its longitudinal direction extends from right to left in upward direction.

In FIG. 5 numerals 18, 19 again designates the sequence of pulses with equal intervals. When the magnet head is displaced from the position in which it provides this pulse sequence in the direction of the rotary axis 12, every two consecutive pulses 18, 19 become spaced apart by a greater distance or are more closely approached to each other, the two pulses changing their positions. The resultant pulse positions are indicated by 25 and 26.

The acute angles between the longitudinal directions of the magnet and the direction of the rotary axis of the disc may be equal to or different from each other. No special requirements apply to the disposition of the magnets, since by the adjustment of the magnet head the correct order of succession of the pulses with equal time intervals can be obtained.

Numerous variants of the embodiments described above may be designed within the scope of the invention. It is possible, for example, to use a device in accordance with the invention to produce pulse sequences having unequal time intervals or having variable time intervals. Such pulse sequences may be utilized for many different purposes.

What is claimed is:

1. A device for producing a pulse sequence in dependence upon the number of revolutions of a rotatable system, in which the periphery of a rotatable disc of the system is provided at different places with magnets and a stationary magnet head is provided, along which the magnets can be passed, characterized in that two magnets, each having an elongated pole-face are provided diametrically at the periphery of the disc for obtaining two pulses in each revolution of the rotatable disc, at least one of the pole-faces being arranged with its longitudinal axis at an acute angle to the direction of the rotary axis of the disc, whilst the magnet head is adjustable in the direction of the rotary axis of the disc.

2. A device as claimed in claim 1, characterized in that each of the pole-faces is formed by a side-face of a rod magnet, being magnetised transversely to its longitudinal axis, said pole faces being arranged in a plane tangential to the periphery of the disc.

3. A device as claimed in claim 2, characterized in that both of the rod magnets are arranged so that their longitudinal directions are inclined to the direction of the rotary axis of the disc, the directions of inclination, viewed in a projection in the direction of a line connecting the centre of one magnet with the centre of the other, being the same.

References Cited

UNITED STATES PATENTS

| 2,113,226 | 4/1938 | Young | 310—169 |
|---|---|---|---|
| 3,132,337 | 5/1964 | Martin | 310—170 |
| 3,134,918 | 5/1964 | Eichenberger | 310—168 |
| 3,292,082 | 12/1966 | Braine. | |
| 3,355,645 | 11/1967 | Kawakami | 310—156 |

MILTON O. HIRSHFIELD, Primary Examiner

R. SKUDY, Assistant Examiner

U.S. Cl. X.R.

179—100.2; 310—156; 340—174.1